United States Patent [19]

Kapland

[11] Patent Number: 4,762,623

[45] Date of Patent: Aug. 9, 1988

[54] LANDFILL COMPOSITION AND METHOD OF PRODUCING THE SAME

[75] Inventor: Mitchell A. Kapland, Annapolis, Md.

[73] Assignee: Trident Engineering Associates, Inc., Annapolis, Md.

[21] Appl. No.: 930,572

[22] Filed: Nov. 14, 1986

[51] Int. Cl.$^4$ ............................................. C02F 11/14
[52] U.S. Cl. .................................... 210/751; 210/908; 210/912; 106/117; 405/129
[58] Field of Search ............... 210/751, 717, 716, 710, 210/723, 747, 919, 908, 912; 405/128, 129, 266; 106/85, 78, 117, 120

[56] References Cited

U.S. PATENT DOCUMENTS

| | | | |
|---|---|---|---|
| 4,028,130 | 6/1977 | Webster et al. | 210/751 X |
| 4,432,666 | 2/1984 | Frey et al. | 210/751 X |
| 4,547,290 | 10/1985 | Pichat | 210/751 |
| 4,601,832 | 7/1986 | Hooykaas | 210/751 X |
| 4,687,373 | 8/1987 | Folk et al. | 210/751 X |

*Primary Examiner*—Tom Wyse
*Attorney, Agent, or Firm*—Cushman, Darby & Cushman

[57] ABSTRACT

A landfill composition containing no free liquid as determined by the paint filter test protocol wherein a 100 ml sample of the landfill composition containing an industrial waste product, placed in a 400 micron conical paint filter for five minutes, passes no water through the filter, is produced by admixing the industrial waste product with 5 to 80 weight percent, based on the total solids content of the industrial waste product, of finely grounded granulated blast furnace slag comprising 30–40 percent $SiO_2$, 40–45 percent $CaO$, 10–20 percent $Al_2O_3$, 3–10 percent $MgO$, 1–3 percent S, 0.3–3 percent $MnO$, 0.3 percent $Fe_2O_3$ and a trace of phosphorous, the finely ground granulated blast furnace slag having a Blaine particle size of about 1,800–6,000 sq.cm/g.

14 Claims, No Drawings

LANDFILL COMPOSITION AND METHOD OF PRODUCING THE SAME

BACKGROUND OF THE INVENTION

The present invention relates to a landfill composition and to a process for producing said landfill composition which contains no free liquid as determined by the paint filter test protocol.

This paint filter test protocol is described in the Federal Register, Vol. 47, No. 38, page 8311 and requires that a 100 ml sample of said composition placed in a 400 micron conical paint filter for five minutes passes no water through said filter.

The disposal of industrial waste materials presents significant economic and ecological problems for manufacturers and municipalities. While at times it has been found appropriate and possible to incinerate certain types of industrial wastes, often as not industrial wastes have been treated with various products to convert them to a disposable form. Notwithstanding such prior art processes, the conversion of industrial wastes to a landfill meeting the above-identified "no free liquid" criteria has up to now been difficult and/or economically unfeasible, especially when it is desired that the resulting landfill composition exhibits load supportive properties and any toxic pollutants contained therein are essentially non-leachable by virtue of being fixed in the load supportive, highly impermeable mass.

SUMMARY OF THE INVENTION

In one aspect, the present invention relates to a process for converting industrial waste products into a landfill containing no free liquid as determined by the paint filter test protocol wherein a 100 ml sample of a composition containing said industrial waste, placed in a 400 micron conical paint filter for five minutes, passes no water through said filter, said process comprising adding to said industrial waste in an amount ranging from about 5 to 80 weight percent and preferably about 5 to 30 weight percent, based on the total solids content in said industrial waste, of a stabilizer comprising finely ground granulated blast furnace slag comprising 30–40 percent $SiO_2$, 40–45 percent CaO, 10–20 percent $Al_2O_3$, 3–10 percent MgO, 1–3 percent S, 0.3–3 percent MnO, 0.3 percent $Fe_2O_3$ and a trace of phosphorous, said finely ground granulated blast furnace slag having a Blaine particle size of about 1,800–6,000 sq.cm./g.

DETAILED DISCUSSION

The industrial waste materials convertible to the landfill composition of the present invention can be those produced, for instance, by industries such as energy producing manufacturers, waste water treatment facilities, by food processors and the like.

The solids content of such industrial wastes generally comprises 1–40 weight percent MgO; 0–25 weight percent $V_2O_5$; 1–55 weight percent $SiO_2$; 1–85 weight percent $Al_2O_3$; 0.2–25 weight percent $Na_2O$; 4–35 weight percent $Fe_2O_3$; 1–10 weight percent NiO; 2–55 weight percent CaO; 0.3–4 weight percent $SO_3$; 0–3 weight percent $K_2O$; 0–1 weight percent ZnO; 0–4 weight percent $P_2O_5$ and 0–3 weight percent $TiO_2$.

In one preferred embodiment of the present invention, the industrial waste product employed has the following composition: 1–17 weight percent MgO; 0–12 weight percent $V_2O_5$; 1–50 weight percent $SiO_2$; 1–30 weight percent $Al_2O_3$; 0.5–2 weight percent $Na_2O$; 8–35 weight percent $Fe_2O_3$; 1–4 weight percent NiO; 2–55 weight percent CaO; 1–4 weight percent $SO_3$; 3 weight percent $K_2O$; 1 weight percent ZnO; 4 weight percent $P_2O_5$ and 1–3 weight percent $TiO_2$.

In another preferred embodiment, the industrial waste has the following composition: 8–17 weight percent MgO; 1–6 weight percent $V_2O_5$; 1–4 weight percent $SiO_2$; 10–22 weight percent $Al_2O_3$; 0.5–1.0 weight percent $Na_2O$; 11–35 weight percent $Fe_2O_3$; 1–2 weight percent NiO; 20–55 weight percent CaO; and 1–2 weight percent $SO_3$.

Representative ones of such industrial waste compositions include the following. The amounts of the components of these compositions are those within experimental error.

(1) a waste composition containing: MgO-5 wt%; $V_2O_5$-6 wt%; $SiO_2$-24 wt%; $Al_2O_3$-22 wt%; $Na_2O$-2 wt%; $Fe_2O_3$-23 wt%; NiO-2 wt%; CaO-8 wt%; $SO_3$-4 wt%; ZnO-1 wt%; $K_2O$-3 wt%;

(2) a waste material having a composition comprising: MgO-3 wt%; $SiO_2$-47 wt%; $Al_2O_3$-27wt%; $Na_2O$-1 wt%; $Fe_2O_3$-14 wt%; CaO-2 wt%; $SO_3$-2 wt%; $K_2O$-3 wt%; $TiO_2$-2 wt%;

(3) a waste composition comprising: MgO-1 wt%; $V_2O_5$-2 wt%; $SiO_2$-13 wt%; $Al_2O_3$-52 wt%; $Na_2O$-0.2 wt%; $Fe_2O_3$-19 wt%; NiO-5 wt%; CaO-5 wt%; $TiO_2$-1 wt%; $K_2O$-1.0 wt%; $SO_3$-0.3 wt%;

(4) a sludge composition comprising: MgO-12 wt%; $V_2O_5$-12 wt%; $SiO_2$-4 wt%; $Al_2O_3$-34 wt%; $Na_2O$-1.0 wt%; $Fe_2O_3$-18 wt%; NiO-1 wt%; CaO-16 wt%; $TiO_2$-0.25 wt%; $K_2O$-0.25 wt%; $SO_3$-0.5 wt%;

(5) a waste composition comprising: MgO-8 wt%; $V_2O_5$-1 wt%; $SiO_2$-4 wt%; $Al_2O_3$-22 wt%; $Na_2O$-0.5 wt%; $Fe_2O_3$-20 wt%; NiO-2 wt%; CaO-40 wt%; $TiO_2$-0.25 wt%; $K_2O$-0.25 wt%; $SO_3$-1.0 wt%;

(6) a waste composition comprising: MgO-11 wt%; $V_2O_5$-6 wt%; $SiO_2$-1 wt%; $Al_2O_3$-22 wt%; $Na_2O$-0.6 wt%; $Fe_2O_3$-35 wt%; NiO-2 wt%; CaO-20 wt%; $SO_3$-1.4 wt%; and (7) a waste composition comprising: MgO-17 wt%; $V_2O_5$-1 wt%; $SiO_2$-2 wt%; $Al_2O_3$-11 wt%; $Na_2O$-1.0 wt%; $Fe_2O_3$-12 wt%; NiO-1 wt%; CaO-52 wt%; $TiO_2$-0.25 wt%; $K_2O$-0.25 wt%; $SO_3$-1.5 wt%.

Still another representative industrial waste composition employed in the practice of the present invention is one having the following composition:

| Chemical | Typical Range in Concentration (mg/kg dry weight) |
| --- | --- |
| Total phosphorous | 2,000–3,000 |
| Total Kjeldahl nitrogen | 100–280 |
| Arsenic | 10–25 |
| Cadmium | 12–65 |
| Chromium | 100–800 |
| Copper | 250–400 |
| Mercury | 1–1.5 |
| Manganese | 100–300 |
| Nickel | 100–200 |
| Zinc | 4,000–12,000 |
| Lead | 100–700 |
| Total organic carbon | 20,000–28,000 |
| Phenol | 2–5 |
| Oil and Grease | 62,000–150,000 |
| Total PCB | 30–40 |
| Aldrin | 3 |
| Naphthalene | 2,000 |
| Fluorene | 69 |
| Phenanthrene | 200 |

-continued

|  | Typical Range in Concentration (mg/kg dry weight) |
| --- | --- |
| Fluoroanthene | 150 |
| Acenaphthene | 22 |
| Acenaphthylene | 96 |
| Pyrene | 140 |
| Chrysene | 92 |
| Benzo (k) fluoranthene | 140 |
| Benzo (a) pyrene | 87 |
| Benzo (b) fluoranthene | 140 |
| Benzo (a) anthracene | 86 |
| Indeno (1,2,3,-c,d) pyrene | 50 |
| Physical |  |
| % moisture | 50-80% |
| Specific gravity of solids | 2.50-2.54 |
| Hydraulic conductivity | $10^{-8}$ cm/sec |

The stabilizer which is added to the industrial waste so as to provide a landfill composition containing no free water as defined above is a ground, granulated blast furnace slag comprising 30-40 percent $SiO_2$, 40-45 percent CaO, 10-20 percent $Al_2O_3$, 3-10 percent MgO, 1-3 percent S, 0.3-3 percent MnO, 0.3 percent $Fe_2O_3$ and a trace of phosphorous, said finely ground granulated blast furnace slag having a Blaine particle size of about 1,800-6,000 sq.cm./g.

This stabilizer is employed in an amount ranging from about 5 to 80 weight percent based on the solids content of said industrial waste material.

It has also been found convenient in one embodiment of the present invention to add quick lime to the industrial waste material in an amount ranging from about 5 to 20 weight percent.

In still another embodiment of the present invention it has been found advantageous to add calcium stearate to the industrial waste material in an amount ranging from about 5 to 10 weight percent based on the solids content of said industrial waste material.

Yet another embodiment of the present invention involves the addition of about 15-20 weight percent of sodium silicate based on the solids content of the industrial waste material.

It has also been found advantageous to admix about 20-300 weight percent fly ash with the stabilized industrial waste, based on the solids content of the industrial waste material, so as to provide the landfill composition of the present invention.

As noted above, the landfill composition of the present invention is one containing no free liquid as determined by the paint filter test protocol wherein a 100 ml sample of a composition containing said industrial waste material, placed in a 400 micron conical paint filter for five minutes, passes no water through said filter. These filters are commercially available in paint and hardware stores. Accordingly, the present invention is also concerned with such a landfill composition comprising the untreated industrial waste material and from about 5 to 80 weight percent, based on the total solids content thereof, of the finely ground granulated blast furnace slag stabilizer as defined above.

This landfill composition can also include, if desired, one or more of the following adjuvants in the following indicated amounts, based on the solids content of the industrial waste material: about 5-20 weight percent quick lime; about 5-10 weight percent calcium stearate; about 15-20 weight percent sodium silicate; and about 20-300 weight percent fly ash.

The landfill composition of the present invention, after a period of time ranging from about 4 to 90 days and preferably about 21 to 60 days, can develop a load supportive property ranging from about 0.5-4.5+ tons/ft$^2$ and preferably about 3 tons/ft$^2$ and higher and a water permeability of about $1 \times 10^{-6}$ cm$^2$/sec or less.

A further advantage of the landfill composition of the present invention is that the landfill composition will stabilize underwater and that the landfill composition can be placed in layers with each successive layer stabilizing to the desired degree, whether the placement of the layers takes place underwater or not.

The following non-limiting examples are given to illustrate the present invention.

In all the Examples the stabilizer is a finely ground granulated blast furnace slag comprising 30-40 percent $SiO_2$, 40-45 percent CaO, 10-20 percent $Al_2O_3$, 3-10 percent MgO, 1-3 percent S, 0.3-3 percent MnO, 0.3 percent $Fe_2O_3$ and a trace of phosphorous, said finely ground granulated blast furnace slag having a Blaine particle size of about 1,800-6,000 sq.cm./g.

In Examples I-III the industrial waste material has the following composition and characteristics:

|  | Typical Range in Concentration (mg/kg dry weight) |
| --- | --- |
| Chemical |  |
| Total phosphorous | 2,000-3,000 |
| Total Kjeldahl nitrogen | 100-280 |
| Arsenic | 10-25 |
| Cadmium | 12-65 |
| Chromium | 100-800 |
| Copper | 250-400 |
| Mercury | 1-1.5 |
| Manganese | 100-300 |
| Nickel | 100-200 |
| Zinc | 4,000-12,000 |
| Lead | 100-700 |
| Total Organic Carbon | 20,000-28,000 |
| Phenol | 2-5 |
| Oil and Grease | 62,000-150,000 |
| Total PCB | 30-40 |
| Aldrin | 3 |
| Naphthalene | 2,000 |
| Fluorene | 69 |
| Phenanthrene | 200 |
| Fluoranthene | 150 |
| Acenaphthene | 22 |
| Acenaphthylene | 96 |
| Pyrene | 140 |
| Chrysene | 92 |
| Benzo (k) fluoranthene | 140 |
| Benzo (a) pyrene | 87 |
| Benzo (b) fluoranthene | 140 |
| Benzo (a) anthracene | 86 |
| Indeno (1,2,3,-c,d) pyrene | 50 |
| Physical |  |
| % moisture | 50-80% |
| Specific gravity of solids | 2.50-2.54 |
| Hydraulic conductivity | $10^{-8}$ cm/sec |

EXAMPLE I

The above industrial waste material dewatered to a 50% solids content was admixed with the stabilizer, defined above, in each of Samples 1-5 below in the amounts indicated.

| Sample | Composition | Grams of Solids | Stabilizer as % of Sludge | Stabilizer as % of Solids |
| --- | --- | --- | --- | --- |
| 1 | 211.5 g industrial waste | 105.75 | 7.5 | 15.0 |

-continued

| Sample | Composition | Grams of Solids | Stabilizer as % of Sludge | Stabilizer as % of Solids |
|---|---|---|---|---|
|  | 15.8 g stabilizer | 15.80 |  |  |
| 2 | 203.4 g industrial waste | 101.70 | 5.0 | 10.0 |
|  | 10.15 g stabilizer | 10.15 |  |  |
| 3 | 216.0 g industrial waste | 108.00 | 10.0 | 20.0 |
|  | 21.6 g stabilizer | 21.60 |  |  |
| 4 | 191.2 g industrial waste | 95.60 | 2.5 | 5.0 |
|  | 4.78 g stabilizer | 4.78 |  |  |
| 5 | 192.0 g industrial waste | 96.0 | 5.0 | 10.0 |
|  | 9.6 g stabilizer | 9.6 |  |  |
|  | 4.8 g quick lime | 4.8 |  |  |

| Penetrometer Readings - after 60 days | |
|---|---|
| Sample | Tons/ft$^2$ |
| 1 | 2.0 |
| 2 | 3.0 |
| 3 | 4.5 |
| 4 | 0 |
| 5 | .5 |

The above samples passed the paint filter test conducted in accordance with the protocol noted above, thus establishing that the resulting stabilized material is suitable as a landfill composition.

EXAMPLE II

Each of samples 1A, 2A, 3A, 4A, 5A and 6A was placed in an incubator maintained at a temperature of 38° C. Each of samples 1B, 2B, 3B, 4B, 5B and 6B was maintained at ambient temperature. The above-identified industrial waste was dewatered to 50 percent solids content.

| Samples | Composition | Grams of Solids | Stabilizer as % of Sludge | Stabilizer as % of Solids |
|---|---|---|---|---|
| 1 A&B | 200 g industrial waste | 100 | 10.0 | 18.2 |
|  | 20 g stabilizer | 20 |  |  |
|  | 10 g quick lime | 10 |  |  |
| 2 A&B | 200 g industrial waste | 100 | 7.5 | 13.0 |
|  | 15 g stabilizer | 15 |  |  |
|  | 15 g quick lime | 15 |  |  |
| 3 A&B | 200 g industrial waste | 100 | 5.0 | 9.1 |
|  | 10 g stabilizer | 10 |  |  |
|  | 5 g quick lime | 5 |  |  |
|  | 5 g calcium stearate | 5 |  |  |
| 4 A&B | 200 g industrial waste | 100 | 10.0 | 16.7 |
|  | 20 g stabilizer | 20 |  |  |
|  | 10 g quick lime | 10 |  |  |
|  | 10 g calcium stearate | 10 |  |  |
| 5 A&B | 200 g industrial waste | 100 | 10.0 | 16.7 |
|  | 20 g stabilizer | 20 |  |  |
|  | 20 g quick lime | 20 |  |  |
| 6 A&B | 200 g industrial waste | 100 | 10.0 | 16.7 |
|  | 20 g stabilizer | 20 |  |  |
|  | 20 g quick lime | 20 |  |  |
|  | 20 ml sodium silicate |  |  |  |

| Penetrometer Readings - after about 60 days | |
|---|---|
| Samples | Tons/ft$^2$ |
| 1 A&B | 4.5+ |
| 2 A&B | 3.2 |
| 3 A&B | 4.5+ |
| 4 A&B | 4.5+ |
| 5 A&B | 4.5+ |
| 6 A&B | 4.5+ |

The above samples passed the paint filter test conducted in accordance with the protocol noted above, thus establishing that the resulting stabilized industrial waste material is suitable as a landfill composition.

EXAMPLE III

Each of Samples 1A, 2A, 3A and 4A was placed in an incubator maintained at a temperature of approximately 38° C. Each of Samples 1B, 2B, 3B and 4B was maintained at ambient temperature. The above-identifed industrial waste was dewatered to 50 percent solids content.

| Sample | Composition | Grams of Solids | Stabilizer as % of Sludge | Stabilizer as % of Solids |
|---|---|---|---|---|
| 1 A&B | 200 g industrial waste | 100 | 10.0 | 18.2 |
|  | 20 g stabilizer | 20 |  |  |
|  | 10 g quick lime | 10 |  |  |
|  | 10 ml sodium silicate |  |  |  |
| 2 A&B | 200 g industrial waste | 100 | 10.0 | 19.0 |
|  | 20 g stabilizer | 20 |  |  |
|  | 5 g quick lime | 5 |  |  |
|  | 5 ml sodium silicate |  |  |  |
| 3 A&B | 200 g industrial waste | 100 | 10.0 | 17.3 |
|  | 20 g stabilizer | 20 |  |  |
|  | 15 g quick lime | 15 |  |  |
|  | 10 ml sodium silicate |  |  |  |
| 4 A&B | 200 g industrial waste | 100 | 10.0 | 17.3 |
|  | 20 g stabilizer | 20 |  |  |
|  | 15 g quick lime | 15 |  |  |
|  | 5 ml sodium silicate |  |  |  |

| Penetrometer Readings - after about 21 days | |
|---|---|
| Samples | Tons/ft$^2$ |
| 1 A&B | 4.5+ |
| 2 A&B | 4.5+ |
| 3 A&B | 4.5 |
| 4 A&B | 4.5+ |

The above samples passed the paint filter test conducted in accordance with the protocol noted above, thus establishing that the resulting stabilized industrial waste material is suitable as a landfill composition.

In Examples IV–X the industrial waste material employed has the following average compositions: 1–17 weight percent MgO; 1–50 weight percent $SiO_2$; 1–30 weight percent $Al_2O_3$; 0.5–2 weight percent $Na_2O$; 8–35 weight percent $Fe_2O_3$; 1–4 weight percent NiO; 2–55 weight percent CaO; 1–4 weight percent $SO_3$; 3 weight percent $K_2O$; 1 weight percent ZnO; 4 weight percent $P_2O_5$; and 1–3 weight percent $TiO_2$.

EXAMPLE IV

The above industrial waste material was dewatered to a 12 percent solids concentration and employed to produce the following landfill compositions:

| Sample | Composition | Grams of Solids | Stabilizer as % of Sludge | Stabilizer as % of Solids |
|---|---|---|---|---|
| 1A | 200.0 g industrial waste | 24.0 | 7.25 | 14.8 |
|  | 73.5 g fly ash | 73.5 |  |  |
|  | 14.5 g stabilizer | 14.5 |  |  |
| 1B | 200.0 g industrial waste | 24.0 | 12.00 | 24.6 |
|  | 73.5 g fly ash | 73.5 |  |  |
|  | 24.0 g stabilizer | 24.0 |  |  |
| 2A | 200.0 g industrial waste | 24.0 | 3.60 | 15 |
|  | 24.0 g fly ash | 24.0 |  |  |
|  | 7.2 g stabilizer | 7.2 |  |  |
| 2B | 200.0 g industrial waste | 24.0 | 6.00 | 25 |

-continued

| Sample | Composition | Grams of Solids | Stabilizer as % of Sludge | Stabilizer as % of Solids |
|---|---|---|---|---|
|  | 24.0 g fly ash | 24.0 |  |  |
|  | 12.0 g stabilizer | 12.0 |  |  |

Samples 1A, 1B and 2B passed the paint filter test conducted in accordance with the protocol noted above, i.e. no free liquor was noted at the completion of the 5-minute test. The composition of Sample 2A was moist and soft.

EXAMPLE V

The above industrial waste was dewatered to 50 percent solids and employed to produce the following landfill compostions:

| Sample | Composition | Grams of Solids | Stabilizer as % of Sludge | Stabilizer as % of Solids |
|---|---|---|---|---|
| 1 | 200 g industrial waste | 40 | 7.5 | 15.0 |
|  | 60 g fly ash | 60 |  |  |
|  | 15 g stabilizer | 15 |  |  |
| 2 | 200 g industrial waste | 40 | 5.0 | 10.0 |
|  | 60 g fly ash | 60 |  |  |
|  | 10 g stabilizer | 10 |  |  |
| 3 | 200 g industrial waste | 40 | 2.5 | 5.0 |
|  | 60 g fly ash | 60 |  |  |
|  | 5 g stabilizer | 5 |  |  |

| Penetrometer Readings - after about 5 weeks and about 6½ months, respectively. | | |
|---|---|---|
| Sample | Tons/ft$^2$ | Tons/ft$^2$ |
| 1 | 4.5+ | 4.5+ |
| 2 | 3.0 | 4.0 |
| 3 | — | — |

The above samples passed the paint filter test conducted in accordance with the protocol noted above, thus establishing that the stabilized industrial waste is suitable as a landfill material.

EXAMPLE VI

The above industrial waste material was dewatered to about 50 percent solids and employed to produce the following landfill compositions:

| Sample | Composition | Grams of Solids | Stabilizer as % of Sludge | Stabilizer as % of Solids |
|---|---|---|---|---|
| 1 | 200 g industrial waste | 100 | 23.0 | 23.0 |
|  | 100 g fly ash | 100 |  |  |
|  | 45 g stabilizer | 45 |  |  |
| 2 | 134 g industrial waste | 67 | 15.0 | 15.0 |
|  | 66 g fly ash | 66 |  |  |
|  | 20 stabilizer | 20 |  |  |
| 3 | 67 g industrial waste | 33 | 0 | 0 |
|  | 33 g fly ash | 33 |  |  |
|  | no stabilizer | 0 |  |  |

| Penetrometer Readings - after about 5 weeks | |
|---|---|
| Sample | Tons/ft$^2$ |
| 1 | 4.5 |
| 2 | 4.5 |
| 3 | 0 |

Samples 1 and 2 passed the paint filter test conducted in accordance with the protocol noted above, thus establishing that the compositions of Samples 1 and 2 are suitable as landfill material.

EXAMPLE VII

The above industrial waste material was dewatered to about 9 percent solids and employed to produce the following landfill compositions:

| Sample | Composition | Grams of Solids | Stabilizer as % of Sludge | Stabilizer as % of Solids |
|---|---|---|---|---|
| 1 | 200 g industrial waste | 18 | 15.0 | 44.0 |
|  | 50 g fly ash | 50 |  |  |
|  | 30 g stabilizer | 30 |  |  |
| 2 | 200 g industrial waste | 18 | 7.5 | 22.0 |
|  | 50 g fly ash | 50 |  |  |
|  | 15 g stabilizer | 15 |  |  |
| 3 | 200 g industrial waste | 18 | 15.0 | 69.7 |
|  | 25 g fly ash | 25 |  |  |
|  | 30 g stabilizer | 30 |  |  |
| 4 | 200 g industrial waste | 18 | 7.5 | 34.8 |
|  | 25 g fly ash | 25 |  |  |
|  | 15 g stabilizer | 15 |  |  |

| Penetrometer Readings - after 2 weeks and 5½ months, respectively. | | |
|---|---|---|
| Sample | Tons/ft$^2$ | Tons/ft$^2$ |
| 1 | 4.50 | 4.5+ |
| 2 | .50 | 3.5 |
| 3 | 4.00 | 4.5 |
| 4 | .25 | 2.5 |

The above samples passed the paint filter test conducted in accordance with the protocol noted above, thus establishing that they are suitable as landfill material.

EXAMPLE VIII

The above industrial waste material was dewatered to 50 percent solids and employed to produce the following landfill compositions:

| Sample | Composition | Grams of Solids | Stabilizer as % of Sludge | Stabilizer as % of Solids |
|---|---|---|---|---|
| 1 | 200 g industrial waste | 100 | 2.5 | 5.0 |
|  | 5 g stabilizer | 5 |  |  |
| 2 | 200 g industrial waste | 100 | 5.0 | 10.0 |
|  | 10 g stabilizer | 10 |  |  |
| 3 | 200 g industrial waste | 100 | 10.0 | 20.0 |
|  | 20 g stabilizer | 20 |  |  |
| 4 | 200 g industrial waste | 100 | 15.0 | 30.0 |
|  | 30 g stabilizer | 30 |  |  |

| Penetrometer Readings - after about one month and 4½ months, respectively. | | |
|---|---|---|
| Sample | 1 Month Tons/ft$^2$ | 4.5 Months Tons/ft$^2$ |
| 1 | 0.5 | 3.5+ |
| 2 | 1.0 | 4.5 |
| 3 | 3.0 | 4.5+ |
| 4 | 4.5 | 4.5+ |

The above samples passed the paint filter test conducted in accordance with the protocol noted above, thus establishing that they are suitable as landfill material.

EXAMPLE IX

The above industrial waste material was dewatered to 50 percent solids for Sample 1 below while it was dewatered to 60 percent solids for Samples 2 and 3. All were then used to produce the following landfill compositions:

| Sample | Composition | Grams of Solids | Stabilizer as % of Sludge | Stabilizer as % of Solids |
|---|---|---|---|---|
| 1 | 200 g industrial waste<br>200 g water<br>80 g stabilizer | 100<br><br>80 | 40 | 80 |
| 2 | 200 g industrial waste<br>200 g water<br>80 g stabilizer | 120<br><br>80 | | |
| 3 | 300 g industrial waste<br>22 g stabilizer<br>5 g quick lime<br>24 g water | 180<br>22<br>5 | 7.3 | 11.8 |

| Penetrometer Readings - after about 30 days. | |
|---|---|
| Sample | Tons/ft² |
| 1 | 4.5+ |
| 2 | 4.5+ |
| 3 | 4.5+ |

The above samples passed the paint filter test conducted in accordance with the protocol noted above, thus establishing that they are suitable as landfill material.

EXAMPLE X

The above industrial waste material was dewatered to 50 percent solids and employed to produce the following landfill composition.

| Sample | Composition | Grams of Solids | Stabilizer as % of Sludge | Stabilizer as % of Solids |
|---|---|---|---|---|
| 1 | 200 g industrial waste<br>20 g stabilizer<br>2 g potassium chloride | 100<br>20<br>2 | 10 | 20 |
| 2 | 200 g industrial waste<br>30 g stabilizer<br>2 g potassium chloride | 100<br>30<br>2 | 15 | 30 |

| Penetrometer Readings - after about 3 months | |
|---|---|
| Sample | Tons/ft² |
| 1 | 4.5+ |
| 2 | 4.5+ |

EXAMPLE XI

The above industrial waste was dewatered to 50 to 50 percent solids and employed to produce the following landfill compositions:

| Sample | Composition | Grams of Solids | Stabilizer as % of Sludge | Stabilizer as % of Solids |
|---|---|---|---|---|
| 1 | 600 g industrial waste<br>45 g stabilizer | 300<br>45 | 7.5. | 15.0 |
| 2 | 600 g industrial waste | 300 | 7.5 | 13.6 |
| 3 | 45 g stabilizer<br>30 g quick lime<br>600 g industrial waste<br>30 g stabilizer<br>15 g quick lime | 45<br>30<br>300<br>30<br>15 | 5.0 | 9.5 |

| Penetrometer Readings | |
|---|---|
| Sample | Tons/ft² |
| 1 | 2.0+ |
| 2 | 2.0 |
| 3 | 1.5 |

EXAMPLE XII

To the above industrial waste there was added 10 weight percent water. The resulting mixture was employed to produce the following landfill compositions:

| Sample | Composition | Grams of Solids | Stabilizer as % of Sludge | Stabilizer as % of Solids |
|---|---|---|---|---|
| 1 | 600 g mixture<br>60 g stabilizer | 300<br>60 | 10 | 20 |
| 2 | 743 g mixture<br>134 g stabilizer | 371.5<br>134 | 18 | 36 |

| Penetrometer Readings | |
|---|---|
| Sample | Tons/ft² |
| 1 | 4.5+ |
| 2 | 4.5+ |

EXAMPLE XIII

The above industrial waste was employed to produce the following landfill compositions:

| Sample | Composition | Grams of Solids | Stabilizer as % of Sludge | Stabilizer as % of Solids |
|---|---|---|---|---|
| 1 | 100 g industrial waste<br>5 g quick lime<br>10 g stabilizer<br>65 ml water | 75<br>5<br>10 | 10 | 12.5 |
| 2 | 100 g industrial waste<br>5 g quick lime<br>5 g stabilizer<br>60 ml water | 75<br>5<br>5 | 5 | 6.3 |
| 3 | 100 g industrial waste<br>5 g quick lime<br>20 g stabilizer<br>100 ml water | 75<br>5<br>20 | 20 | 25 |
| 4 | 100 g industrial waste<br>10 g stabilizer<br>60 ml water | 75<br>10 | 10 | 13.3 |

| Penetrometer Readings | |
|---|---|
| Sample | Tons/ft² |
| 1 | 4.5+ |
| 2 | 4.5 |
| 3 | 4.5+ |
| 4 | 4,5 |

EXAMPLE XIV

The above industrial waste was diluted from its "as dredged" 85% solids state to 50% solids by the addition of water and employed to produce the following landfill compositions:

| Sample | Composition | Grams of Solids | Stabilizer as % of Sludge | Stabilizer as % of Solids |
|---|---|---|---|---|
| 1 | 200 g industrial waste | 100 | 15 | 28.6 |
|   | 30 g stabilizer | 30 | | |
|   | 5 g quick lime | 5 | | |
| 2 | 200 g industrial waste | 100 | 10 | 19.0 |
|   | 20 g stabilizer | 20 | | |
|   | 5 g quick lime | 5 | | |
| 3 | 200 g industrial waste | 100 | 5 | 9.5 |
|   | 10 g stabilizer | 10 | | |
|   | 5 g quick lime | 5 | | |
| 4 | 200 g industrial waste | 100 | 10 | 19.0 |
|   | 20 g stabilizer | 20 | | |
|   | 5 g sodium silicate | 5 | | |

| Sample | Penetrometer Readings Tons/ft$^2$ |
|---|---|
| 1 | 4.5+ |
| 2 | 4.5+ |
| 3 | — |
| 4 | — |

EXAMPLE XV

The below tests were conducted to determine if the composition would set up under water. The above industrial waste was employed and Samples 1 and 2 were diluted to 15% solids. Samples 3, 4 and 5 were "as dredged", i.e. 60% solids. Approximately 1" of water was added to the top of sample 5 only. Samples 1 and 2 provided their own supernatant.

| Sample | Composition | Grams of Solids | Stabilizer as % of Sludge | Stabilizer as % of Solids |
|---|---|---|---|---|
| 1 | 200 g industrial waste | 30 | 5 | 33.0 |
|   | 10 g stabilizer | 10 | | |
| 2 | 200 g industrial waste | 30 | 10 | 67.0 |
|   | 20 g stabilizer | 20 | | |
| 3 | 200 g industrial waste | 120 | 5 | 8.3 |
|   | 10 g stabilizer | 10 | | |
| 4 | 200 g industrial waste | 120 | 10 | 16.7 |
|   | 20 g stabilizer | 20 | | |
| 5 | 200 g industrial waste | 120 | 10 | 16.7 |
|   | 20 g stabilizer | 20 | | |

| Sample | Penetrometer Readings Tons/ft$^2$ | Tons/ft$^2$ |
|---|---|---|
| 1 | −1.0 | 4.5 |
| 2 | 4.5+ | 4.5+ |
| 3 | 2.25 | 3.5 |
| 4 | 4.5 | 4.5 |
| 5 | 4.5+ | 4.5+ |

EXAMPLE XVI

The following test was carried out to determine if the composition would set up in multiple layers.

| Sample | Composition | Grams of Solids | Stabilizer as % of Sludge | Stabilizer as % of Solids |
|---|---|---|---|---|
| 1 | 200 g industrial waste | 107 | 7.5 | 14.0 |
|   | 15 g stabilizer | 15 | | |

| Layer No. | Day of Layering |
|---|---|
| 1 | Day 1 |
| 2 | Day 2 |
| 3 | Day 3 |
| 4 | Day 6 |
| 5 | Day 7 |

| | Penetrometer Readings | |
|---|---|---|
| Layer No. | Tons/ft$^2$ | Tons/ft$^2$ (~90 days later) |
| 1 | 3.5 | 4.5+ |
| 2 | 1.5 | 4.5+ |
| 3 | 1.0 | 4.5 |
| 4 | 1.0 | 4.5 |
| 5 | 1.0 | 4.5 |

What is claimed is:

1. A process for converting industrial waste product into a landfill composition containing essentially no free liquid as determined by the paint filter test protocol wherein a 100 ml sample of said composition containing said industrial waste product, placed in a 400 micron conical paint filter for five minutes, passes no water through said filter, said process comprising adding to said industrial waste product in an amount ranging from about 5 to 80 weight percent based on the total solids content in said industrial waste product of finely ground granulated blast furnace slag comprising 30–40 percent SiO$_2$, 40–45 percent CaO, 10–20 percent Al$_2$O$_3$, 3–10 percent MgO, 1–3 percent S, 0.3–3 percent MnO, 0.3 percent Fe$_2$O$_3$ and a trace of phosphorous, said finely ground granulated blast furnace slag having a Blaine particle size of about 1,800–6,000 sq.cm./g and permitting said landfill composition to develop after a period of time ranging from about 4 to 90 days a load supportive property ranging from about 0.5 to about 4.5 tons/ft$^2$ and a water permeability of about $1 \times 10^{-6}$ cm$^2$/sec or less.

2. The process of claim 1 wherein from about 5 to 30 weight percent, based on the total solids content in said industrial waste product, of said finely divided ground granulated blast furnace slag is added to said industrial waste product.

3. The process of claim 1 wherein the solids content of said industrial waste product comprises 1–40 weight percent MgO; 0–25 weight percent V$_2$O$_5$; 1–55 weight percent SiO$_2$; 1–85 weight percent Al$_2$O$_3$; 0.2–25 weight percent Na$_2$O; 4–35 weight percent Fe$_2$O$_3$; 1–10 weight percent NiO; 2–55 weight percent CaO; 0.3–4 weight percent SO$_3$; 0–3 weight percent K$_2$O; 0–1 weight percent ZnO; 0–4 weight percent P$_2$O$_5$ and 0–3 weight percent TiO$_2$.

4. The process of claim 3 which also includes adding calcium stearate in an amount ranging from 5–10 weight percent based on the solids content of said industrial waste product.

5. The process of claim 3 which also includes adding sodium silicate in an amount of about 15–20 weight percent based on the solids content of said industrial waste product.

6. The process of claim 1 which also includes adding quick lime to said industrial waste product in an amount ranging from 5-20 weight percent based on the solids content of said industrial waste product.

7. The process of claim 1 which also includes adding fly ash in an amount of about 20-300 weight percent based on the solids content of said industrial waste product.

8. The process of claim 1 wherein said industrial waste product has the following composition expressed in mg/kg dry weight: total phosphorous-2,000 to 3,000; total Kjeldahl nitrogen-100 to 280; arsenic-10 to 25; cadmium-12 to 65; chromium-100 to 800; copper-250 to 400; mercury-1 to 1.5; manganese-100 to 300; nickel-100 to 200; zinc-4,000 to 12,000; lead-100 to 700; total organic carbon-20,000 to 28,000; phenol-2 to 5; oil and grease-62,000 to 150,000; total PCB-30 40; aldrin-3; naphthalene-2,000; fluorene-69; phenanthrene-200; fluoroanthene-150; acenaphthene-22; acenaphthylene-96; pyrene-140; chrysene-92; benzo (k) fluoroanthene-140; benzo (a) pyrene-87; benzo (b) fluoranthene-140; and benzo (a) anthracene-86; indeno (1,2,3,-c,d)pyrene-50; said composition having 50-80 percent moisture.

9. A landfill composition containing essentially no free liquid as determined by the paint filter test protocol wherein a 100 ml sample of said composition containing an industrial waste product, placed in a 400 micron conical paint filter for five minutes, passes no water through said filter, said composition comprising a mixture of an industrial waste product and from 5 to 80 weight percent based on the total solids content thereof of finely ground granulated blast furnace slag comprising 30-40 percent $SiO_2$, 40-45 percent CaO, 10-20 percent $Al_2O_3$, 3-10 percent MgO, 1-3 percent S, 0.3-3 percent MnO, 0.3 percent $Fe_2O_3$ and a trace of phosphorous, said finely ground granulated blast furnace slag having a Blaine particle size of about 1,800-6,000 sq.cm./g and said landfill composition having a load supportive property ranging from about 0.5 to about 4.5 tons/ft$^2$ and a water permeability of about $1 \times 10^{-6}$ cm$^2$/sec or less.

10. The landfill composition of claim 9 wherein said industrial waste product comprises 1-40 weight percent MgO; 0-25 weight percent $V_2O_5$; 1-55 weight percent $SiO_2$; 1-85 weight percent $Al_2O_3$; 0.2-25 weight percent $Na_2O$; 4-35 weight percent $Fe_2O_3$; 1-10 weight percent NiO; 2-55 weight percent CaO; 0.3-4 weight percent $SO_3$; 0.3 weight percent $K_2O$; 0-1 weight percent ZnO; 0-4 weight percent $P_2O_5$ and 0-3 weight percent $TiO_2$.

11. The landfill composition of claim 9 which also includes quick lime in an amount ranging from 5-20 weight percent based on the solids content of said industrial waste product.

12. The landfill composition of claim 11 which also includes calcium stearate in an amount ranging from 5-10 weight percent based on the solids content of said industrial waste product.

13. The landfill composition of claim 11 which also includes sodium silicate in an amount of about 15-20 weight percent based on the solids content of said industrial waste product.

14. The landfill composition of claim 9 which also includes fly ash in an amount of about 20-300 percent by weight based on the solids content of said industrial waste product.

* * * * *